United States Patent
Armanno, Sr.

[11] Patent Number: 6,055,764
[45] Date of Patent: May 2, 2000

[54] SURF CASTING BOX AND REEL

[76] Inventor: Frank Armanno, Sr., 6693 Picante Cir., Fort Pierce, Fla. 34951

[21] Appl. No.: 09/188,451

[22] Filed: Nov. 9, 1998

[51] Int. Cl.⁷ .................................................. A01K 91/02
[52] U.S. Cl. .................................................................. 43/19
[58] Field of Search ............................... 43/4, 191; 124/8, 124/23.1; 242/323, 224

[56] References Cited

U.S. PATENT DOCUMENTS

| | | | |
|---|---|---|---|
| 1,133,189 | 3/1915 | Shannon | 124/23.1 X |
| 3,084,467 | 4/1963 | Bromwell | 43/19 |
| 3,377,999 | 4/1968 | Reynolds | 43/19 X |
| 3,949,730 | 4/1976 | Schoenberger | 124/23.1 X |
| 4,024,667 | 5/1977 | Wegener | 43/19 |
| 4,773,179 | 9/1988 | Corley | 43/19 |
| 5,553,413 | 9/1996 | Gannon | 43/6 |

*Primary Examiner*—Michael J. Carone
*Assistant Examiner*—Jeffrey L. Gellner
*Attorney, Agent, or Firm*—Kevin Redmond

[57] ABSTRACT

A surf casting system employing a specially designed bow and arrow and a reel which are capable of projecting a fishing line along with a leader line, hook and bait to distances greater than 100 yards, permitting fishing at distances from the shore that were heretofore generally unattainable with conventional equipment. The bow supports the reel which carries the fishing line. The axis of rotation of the reel is oriented parallel to the direction of flight of the arrow, enabling the line to spill off from the reel at the high speed of the arrow. A line damping system is employed to keep the line sufficiently taught and confined to preventing the tangling of the line as it is released from the reel. The damping system is designed to function without appreciably affecting the speed and distance of the arrow. The composition and density of the arrow is varied to permit either surface or bottom fishing.

4 Claims, 3 Drawing Sheets

SURF CASTING BOX AND REEL

BACKGROUND

1. Field

The present invention relates generally to fishing equipment and more particularly to surf casting equipment.

2. Prior Art

Predominantly, surf casting is accomplished using commonly available fishing poles and reels. The reel contains fishing line which is wound about the reel. The free end of the fishing line is passed through an eyelet at the end of the pole that is positioned away from the fisherman and this end of the line is usually attached to a weight. To cast the line, the end of the pole away from the fisherman is whipped and the weight at the end of the line is thrown out towards the sea, pulling the fishing line along with it. As line is pulled by the weight, the reel must unwind to release sufficient line to follow the weight. Otherwise the reel will cause the flight of the weight to be foreshortened and the casting distance to be reduced from what it potentially could be.

The axis of the reel is normally positioned orthogonally to the direction in which the weight was cast, requiring the line on the reel to be unwound from the reel turn by turn. That is, the reel must revolve at a speed which will release line as fast as the weight on the end of the line is traveling. This conventional method of releasing the line from the reel puts a practical limit on the speed of release of the line as the reels can only unwind at a limited top speed consistent with the rotational moment of the reel, the capacity of the reel bearings and the ability of the line to pass about at least one, and usually more, eyelet's on the pole. The line must unwind and pass through the eyelet's without becoming permanently stretched, bound, tangled or otherwise damaged. The practical limits to the speed of conventional reels and the whipping action of conventional poles generally limits the distance reached with typical casting equipment to about one hundred feet. If a greater casting range could be achieved, a greater fishing area would be available along with a greater variety and quantity of fish.

SUMMARY

It is an object of the present invention to provide for surf casting where the hook and bait can be cast up to and beyond 100 yards.

It is an object of the present invention to provide a reel for surf casting which will permit the release of the line at the high speed of an arrow launched from a bow.

The present invention is a surf casting system which employs a special reel, bow and arrows that have been designed to project the weight, leader, bait and hook to distances of 100 yards or more, permitting fishing at distances from the shore that encompass much larger areas than were previously attainable. The bow carries the reel and fishing line with the axis of rotation of the reel oriented parallel to the direction of flight of the arrow, enabling the line to spill off from the open side of the reel at the high speed of the arrow rather than having to slowly unwind turn by turn as is required with conventional reels. A damping system is employed to absorb the initial shock of the arrow's acceleration as well as to keep the line taught as it unreels to prevent tangling. The damping system is designed to function without appreciably affecting the speed or distance of the arrow.

DETAILED DESCRIPTION OF THE INVENTION

Figure 1:
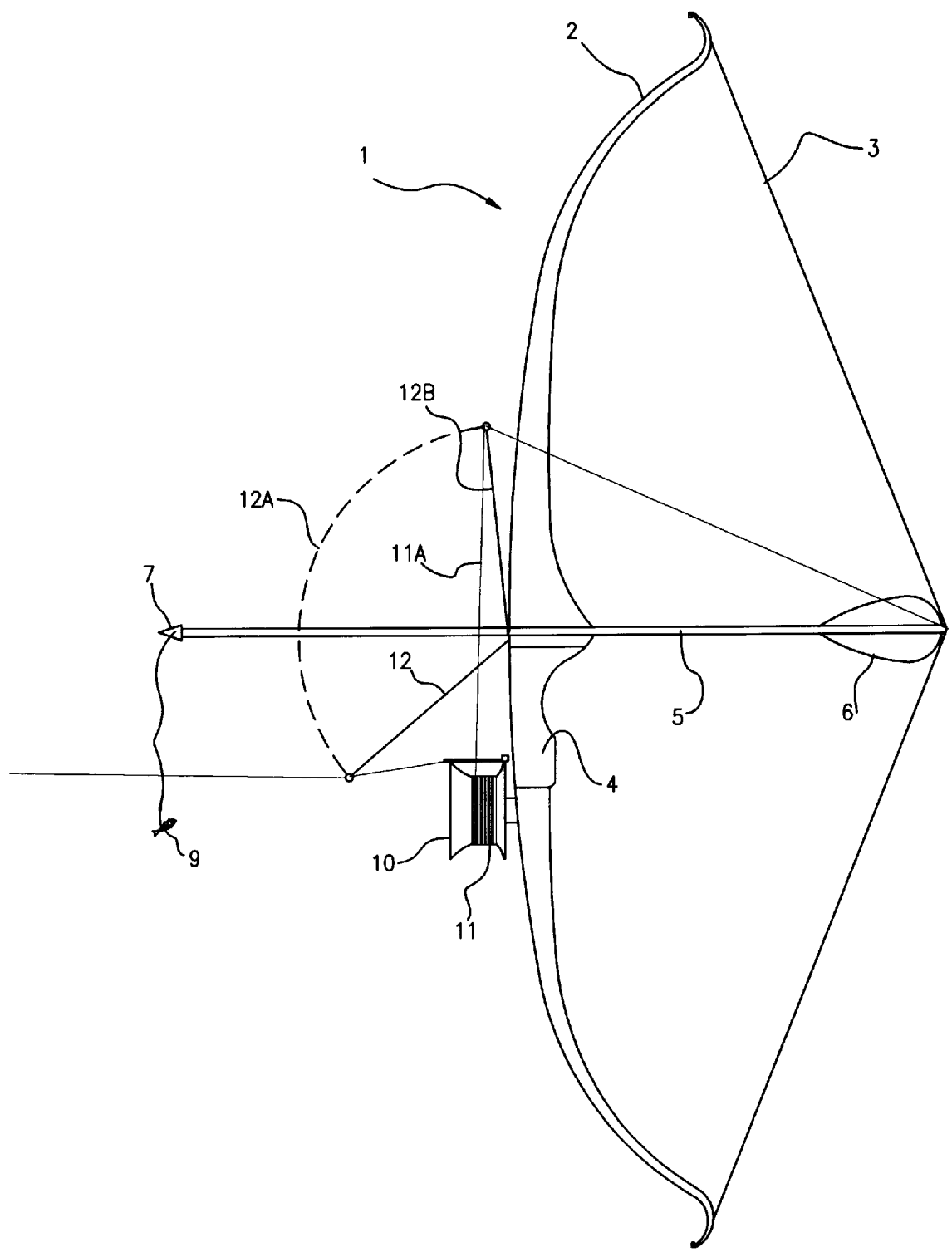
FIG. 1 shows a side view of the bow, illustrating the attached reel as well as the damping system and the arrow which carries the line.

FIG. 1 shows the bow and reel assembly 1 used for surf casting along with other associated equipment designed to make surf casting with a bow feasible. This assembly comprises a bow 2, a bow string 3, an arrow 5 having a tail with feather stabilizers 6 and a point 7, a leader line 8 and a hook and bait 9, a reel 10, fishing line 11 and a damper control 12. The bow comprises a first resilient member 2 with a first or upper end and a second or lower end and a string 3 with a first or upper end and a second or lower end. As is done with a conventional bow, the bow string is stretched from the upper to the lower end of the bow and the rear end of the arrow is detachably placed in contact with the string. The arrow crosses the bow about the bow's midpoint and is aimed in a desired direction of flight which is typically out to sea where the fisherman intends to fish.

The basic operation of this assembly is to use the bow to launch the arrow and to take the line with the arrow to the location at which the arrow lands so that the arrow and any fish catch be retrieved. However, conventional surf casting equipment cannot be used to accomplish this task. To make such a system feasible, several major modifications are necessary. The reel which contains the fishing line wound about it, is mounted to the bow below the midpoint of the bow. The reel's axis of rotation is oriented parallel to the longitudinal axis of the arrow, enabling the line whose free end is attached to the tail end of the arrow to spill off the reel as the arrow takes flight, without requiring the reel to unwind at all. This greatly speeds the rate of release of the line and enables the line to follow the arrow without appreciably slowing the arrow, as would occur with most conventional reels.

The initial shock on the line and the reel produced by the arrow's starting flight is great because the reel and line are initially at rest and then must suddenly accommodate the relative high launch speed of the arrow. The initial shock is absorbed by the damper control which is essentially an arm 12 typically in the form of a rod which is mounting at one end to the center of the bow. The damper control arm is free to rotate about its mounting to the bow along a path of motion 12A shown in FIG. 1 that is generally in a direction which is forward of the bow and also in the direction of the flight of the arrow. A portion of the line 11A is initially taken from the reel and passed through an eyelet 12B at the end of the damper control that is located away from its mounting to the bow.

In the operation of the damper control, the end of the damper control arm containing eyelet 12B is positioned upward while the damper arm itself is positioned parallel to the bow as shown in FIG. 1. The line is passed through the eyelet 12B and then to the tail of the arrow where it is attached to the arrow. As the arrow is released in flight from the bow, the arrow draws the line along with it. The launching shock on the line is absorbed by the damping control as the damping control is drawn forward with the line to trace through the path 12A. As the damper control moves forward over this path, it in effects increases the releases fine in an amount equal to the length of the damper control and this is done as fast as the damper control can be rotated forward.

The damper control mounting adjusts the amount of damping that can be placed on the speed of movement of the damper control. Typically, the mounting includes a screw and a fiber washer which can be used to increase the damping by simply tightening the screw. When the screw is loosened, there is little damping and the damper control will rotates very quickly to keep up with the speed of the arrow. Theoretically, if the damping were negligible, the damper control would in effect release line equal to its own length before any line was drawn from the reel. In practice, there is some damping applied and the reel starts to release line immediately upon the launch of the arrow, but initially the damper control in effect releases more line than the reel, giving the reel a chance to make a smooth transition from being at rest to releasing line at the speed of the arrow. This prevents binding and breaking of the line. The amount of damping is make sufficient to provide this transition and has been found to only slightly affect the speed and distance of the arrow.

It is possible to do without the damper system if a high strength line is used which can withstand the shock of the arrow's launch or if a loop of slack is left between the reel and the arrow to accomplish the same function as the damper; however, the operator must remember to place that slack in the line, whereas, where the damper control is used, the line is automatically protected.

The arrow carries at its tip one end of the leader line 8 while the opposite end the end of the leader line carries the bait and hook 9. In one embodiment of the invention, the arrow is designed to float, enabling the fisherman using this invention to engage in surface fishing. In a second embodiment, the arrow is designed to sink, permitting fishing below the surface.

When a fish has been caught or the fisherman wishes to reel in the line to reset the bait, the reel can be rotated manually to draw in the line, as is carried out with conventional fishing equipment; however, this reel has several special features which enable it to work well with the arrow launching system. The details of the reel are shown in the side cross sectional view in FIG. 2 and the plan view shown in FIG. 3. It can be seen in these Figures that the reel and its associated components include a mounting bracket 19 to attach the reel to the bow, an outside bracket nut 20A and an inside bracket nut 20B which hold the reel to the bracket, a mounting block 21 for a flip back clip 22, a spring 23 for the flip back clip, a tip 24 of the flip back clip, the reel 10 itself which includes an outer wall 10A and an inner wall 10B, the line 11 wound about the reel, a reel retrieval handle 13 for manually winding in the line, a drag/lock control nut 14 for adjusting the drag on the line, a fiber drag washer 15 located between the lock nut and the reel on an axle bolt 16, a cotter pin 17 which passes through the axle bolt out side the drag/lock nut, a washer 18 located about the axle bolt and against the reel near the mounting bracket.

The axle bolt is threaded on both ends. One end of the axle bolt is secured to the bracket 19 by nuts 20A and 20B which are threaded onto the axle bolt and then tightened about the bracket 19. The reel is mounted on and rotates about the middle portion of the axle bolt. This rotation is facilitated by the washer 18 which is located between the nut 20B and the reel. On the end of the axle bolt away from the mounting bracket and beyond the location of the reel are the fiber washer 15, the drag/lock control nut 14 and the cotter pin 17. The control nut 14 is typically a wing nut, permitting the fisherman to tighten it by hand against the fiber washer and the reel to increase the drag on the reel or with sufficient tightening to lock the reel in place. The cotter pin passes through the end of the axle rod and prevents the nut 14 and the reel from inadvertently becoming dismounted from the axle rod.

Figure 2:
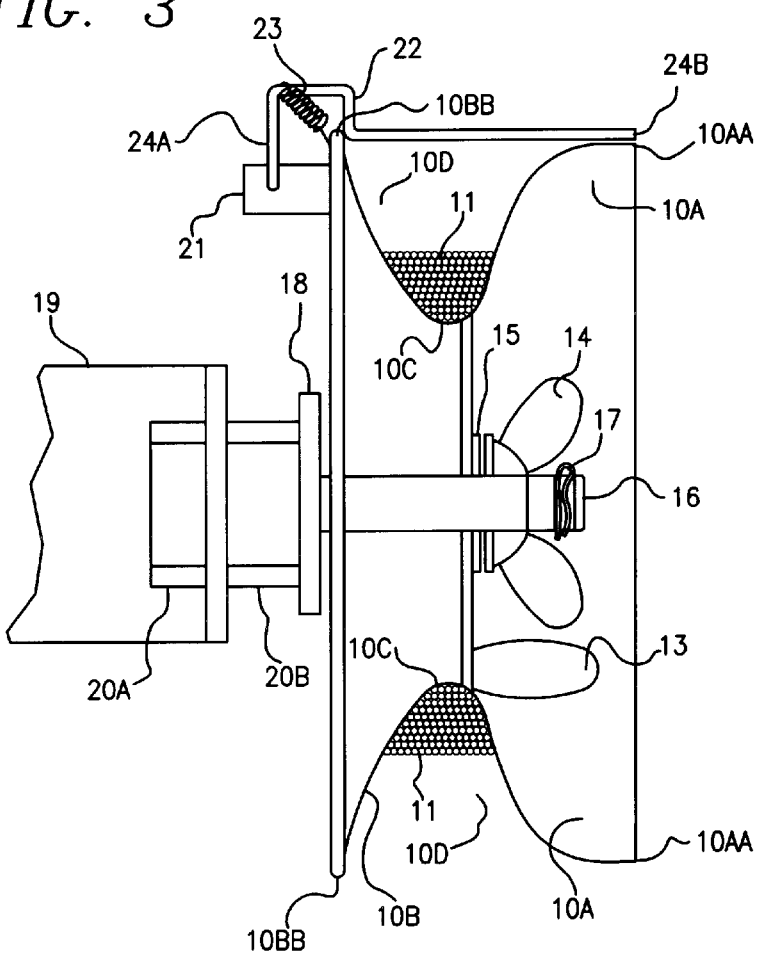
FIG. 2 shows a side cross sectional view of the reel which reveals the tapered contours of the inside walls designed to release the line at high speed while still permitting the line to be retrieved in the familiar manner of a conventional reel.

The internal contours of the reel about the fishing line can be seen in the cross sectional view of FIG. 2. The reel has two walls, the outer wall 10A which is positioned away from the bow, and the inner wall 10B which is positioned adjacent to the bow. The inner surfaces of these two walls have contours which are important to the operation of the reel. The inner surface of the outer wall 10A has a slow rising contour while the inner surface of the inner wall 10B has a fast rising contour. These two contours meet in a valley 10C where the fishing line 11 is wound about the reel and stored. The top of the outer wall 10AA and the top of the inner wall 10BB are defined as the highest contour on these wall which lies at the greatest distance from the center of the reel. The inner wall rises sharply from the well to prevent the line from slipping over the top 10BB of this wall. However, the outer wall rises slowly to permit the line to rapidly slip off over the top 10AA of this wall without any need for the reel to rotate or to be unwound. This feature permits the rapid release of the line to accommodate the speed of the arrow as it is launched and takes flight.

Attached across the top of the reel is a flip back wire clip 22 used to prevent unintentional release of the fishing line from the reel. As can be seen in the upper left in FIG. 2, a mounting block 21 extends outwardly from the reel to provide a rotatable support for a first end of the clip 24A. The clip extends across the valley of the reel where its second end 24B rest on the top 10AA of the outer wall of the reel. A spring 23 is connected from the reel to the clip near the first end of the clip to hold the clip down on the outer wall. The clip traps the line in the valley, but the line can be forced up against the spring tension to let line escape when there is sufficient tension on the line. In this way the clip prevents the inadvertent release of line. Only when there is a strong tension applied, as for example with the launch of an arrow, is the line released.

Figure 3:
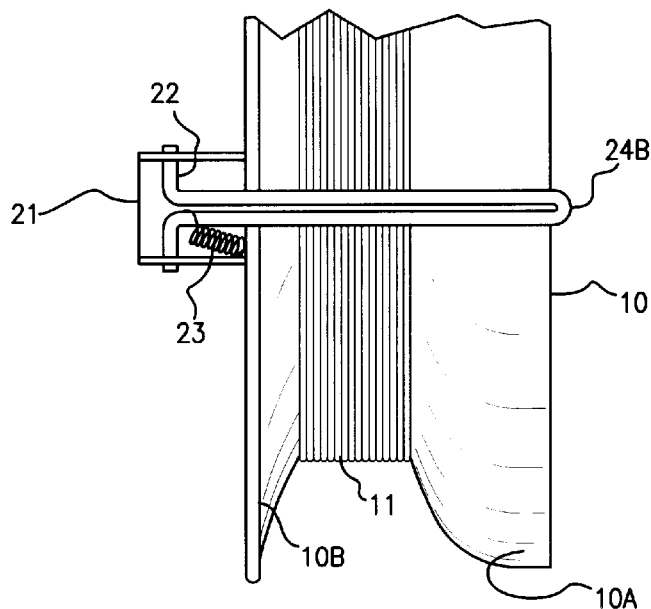
FIG. 3 shows a top view of the reel and a flip back wire clip used to control the line on the reel.

A plan view of the clip is shown in FIG. 3. In the embodiment shown in this figure, it can be seen that the clip is fabricated from a single length of heavy wire which is folded back on it self. Both ends of this wire form the first end of the clip and each is inserted through a hole in the mounting block to form the rotatable joint for the clip.

Figure 4:
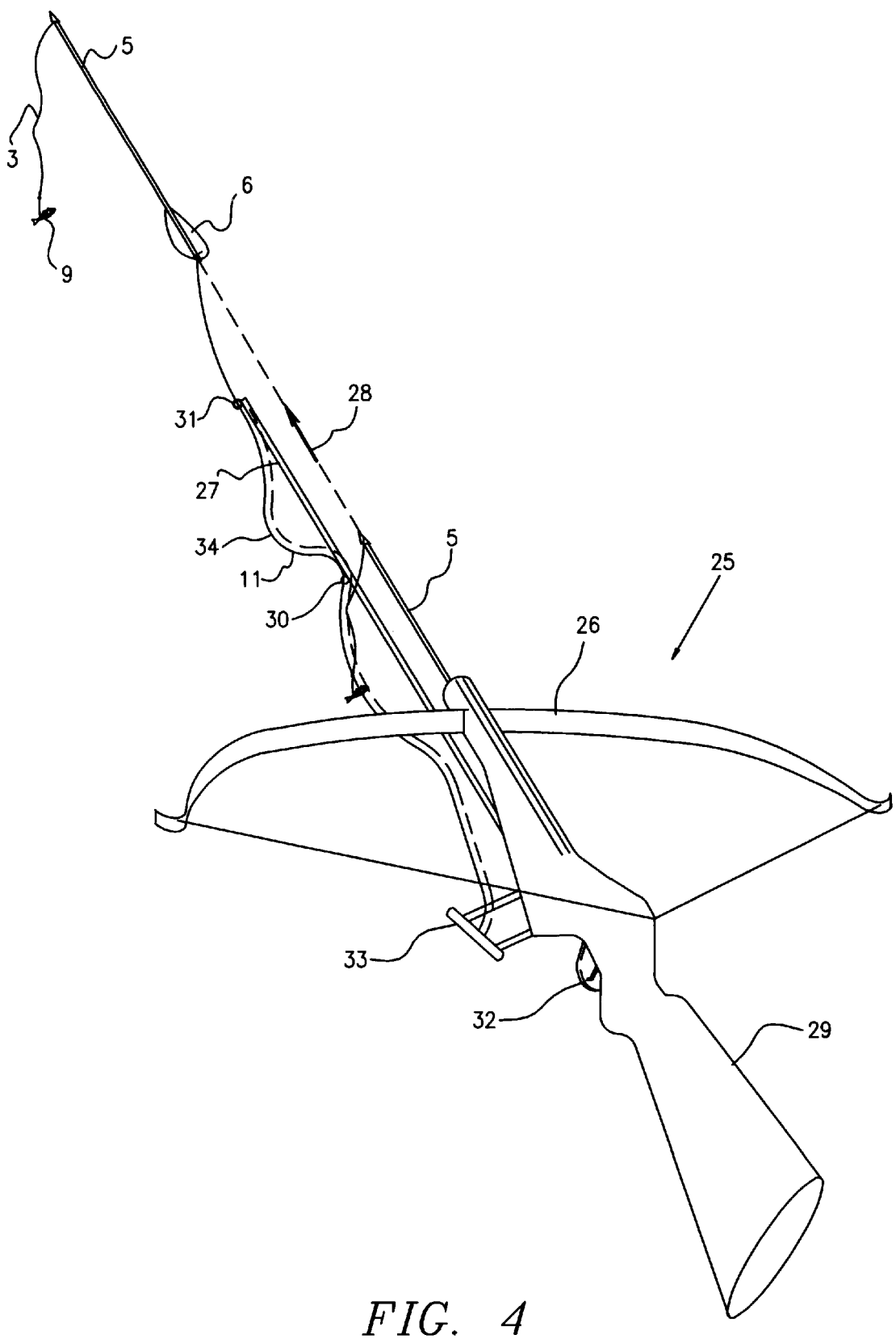
FIG. 4 shows a perspective view of the bow of the present invention after the launch of an arrow.

The cross bow assembly 25 shown in FIG. 4 is an alternative embodiment of the invention which substitutes a cross bow for the long bow shown in FIG. 1. This assembly comprises a stock 29 having a first end containing a shoulder rest and a second end located opposite the end containing the shoulder rest, a bow mounted across the top of the stock at its second end, a trigger 32 mounted on the lower side of the stock, a reel 33 also mounted on the lower side of the stock, a pole 34 mounted on and extending away from the second end of the stock, a first eyelet mounted on the pole generally in its middle portion and a second eyelet mounted on the pole at the end away from the stock. The cross bow employs an arrow 5 having a point and a feathered end with leader line 8 attached to the point of the arrow. A hook, sinker and bait 9 are attached to the end of the leader line away from the arrow tip. A fishing line 11 is stored on the reel 33 and has its free end connected to the feathered end of the arrow. The line is dressed from the reel through eyelet's 30 and 31 before it is connected to the arrow.

In the operation of this embodiment of the invention, the arrow is launched by the cross bow. The launched arrow carries with it the bait and hook as well as the fishing line in a manner similar to that described above in connection with the operation of the long bow embodiment. To accommodate the initial rapid acceleration of the arrow, the line is pulled away from the pole prior to the launch of the arrow to form loops of slack line such as loop 34 shown in FIG. 4. Such loops act in the same manner and thereby take the place of the damper control 12 used with the long bow embodiment. The principal advantage of the cross bow embodiment is cross bows typically use wind up devices or a foot stand to aid in drawing back the bow string, enabling operators with less physical strength to achieve the same performance as those with greater physical strength.

The present invention is not limited to fishing alone. It may be employed in any application where it is desired to place a line that can be reached by an arrow. Typical applications include hunting, emergency operations, life rescue, and outer space retrieval functions.

Other embodiments which employ the principles disclosed herein will be obvious to those skilled in the art and therefore are considered equivalents within the scope of the present invention which is limited only by the following appended claims:

Having disclosed my invention, I claim:

1. A casting system for casting a fishing line in a desired direction, comprising:

(a) an arrow capable of taking flight in said desired direction, which is also referred herein as the desired direction of flight, said arrow having a first and a second end with said first end of said arrow being referred to as the point end and said second end being referred to as the tail end, said point end being directed in the desired direction of flight immediately prior to being launched into flight, and said fishing line having a first and a second end with said first end being connected to said arrow to enable said fishing line to be drawn along with said arrow in said desired direction once said arrow has been launched, (b) a bow for launching said arrow into flight in said desired direction, said bow comprising an elongated, first resilient member having a first and a second end, said bow further comprising a string, said string having a first and a second end with said first end of said string being attached to said first end of said resilient member and said second end of said string being attached to the second end of said resilient member, said string being stretched taught between the ends of said first resilient member and said string being detachable attached to said tail end of said arrow to enable said arrow to be drawn back against said string and away from said first resilient member and then released into flight by means of a quick return of said string to its initial position due to the tension applied to said string by said first resilient member, said quick return to said string propelling said arrow before said string in the desired direction of flight, (c) a leader line having a first and a second end, said first end being attached to said arrow, (d) a fishing hook attached to said second end of said leader line, said hook and leader line being capable of being retrieved after the flight of said arrow by drawing in said fishing line, (e) a drum about which said fishing line can be wound, said drum having an axis of rotation about which said drum can rotate, and (f) an axle passing through said axis of rotation of said drum, said axle being rotatably connected to said drum to permit said drum to rotate about said axle, said axle also being connected to said first resilient member to support said drum on said first resilient member, said first resilient member having a longitudinal axis and a plurality of sides running along its length generally parallel to said longitudinal axis, with one of said plurality of sides being designated as the first side of said first resilient member, said first side of said first resilient member generally facing in the direction of flight of said arrow, said axle of said drum being connected to said first side of said first resilient member in a direction orthogonal to said longitudinal axis of said resilient member and generally parallel to the direction of flight of said arrow, said drum including two ends and two walls designated as the inner and outer walls, said walls being positioned on either end of said drum and generally lying in parallel planes that are oriented orthogonal to said axis of rotation of said drum, said walls being separated by a valley, said valley providing a space for holding said fishing line, said inner wall be located proximate said first resilient member and said outer wall being located away from said first resilient member on the end of said drum which generally faces the direction of flight of said arrow, said outer wall and inner wall each having a top which is the contour of each wall that lies at the farthest distance from the axis of rotation of said drum and said inner and outer walls also having inside surfaces which lie on either side of said valley, the inner surface of said inner wall sloping up towards its top more rapidly than said inner surface of said outer wall to prevent said fishing line when wound on said drum in said valley from spilling over the top of said inner wall, but permitting said line to spill over the top of said outer wall in the desired direction of flight without requiring said reel to rotate to speed the release of said fishing line and permit said line to travel with said arrow without breaking from the force of the launch of said arrow.

2. A casting system as claimed in claim 1 further comprising a flip back clip and a second resilient member, said flip back clip being rotatably mounted to the inner wall of said reel and extending across said valley and the tops of said inner and outer walls and said second resilient member being connected between said flip back clip and said inner wall to flexibly hold and restrain said clip is its position across the tops of the inner and outer walls to prevent said fishing line from sliding off said reel unless there is a force equal to that of a launched arrow applied to said line to overcome the restraint of said second resilient member, said flip back clip being manually retractable against the restraint of said second resilient member to position said clip away from said reel to permit said fishing line to be wound about said reel.

3. A casting system as claimed in claim 1, further comprising a damping system to absorb the initial shock on said fishing line caused by the launch of said arrow into flight, said damping system including a damping arm formed of a rod with a first and a second end, said rod containing a first eyelet at said first end of said rod through which said fishing line is passed before being attached to said arrow and said damping system further including means for rotatably connecting said second end of said rod to generally the middle of said first resilient member to permit rotation of said rod from a first position generally parallel and adjacent to said longitudinal axis of said first resilient member to a second position generally orthogonal to said longitudinal axis of said first resilient member and generally in the direction of flight of said arrow, said damping arm, in rotating from said first position to said second position, releasing a length of fishing line before any of said fishing line is drawn from said reel to immediately provide a strain relief for said fishing line upon the launch of said arrow.

4. A casting system as claimed in claim 3 wherein said means for rotatably connecting said second end of said damping system rod to generally the middle of said first resilient member comprises a second eyelet at said second end of said rod, a fiber washer, and a screw, said screw passing through said second eyelet and said fiber washer and into said first resilient member to rotatably connect said rod to said first resilient member and to provide damping to the movement of said rod determined by the force applied by said screw on said rod against said fiber washer.

* * * * *

UNITED STATES PATENT AND TRADEMARK OFFICE
CERTIFICATE OF CORRECTION

PATENT NO. : 6,055,764
DATED : May 2, 2000
INVENTOR(S) : Armanno, Sr.

It is certified that error appears in the above-identified patent and that said Letters Patent is hereby corrected as shown below:

On the title page, Item [54] & col. 1, line 1, should read

-- SURF CASTING BOW AND REEL --

Signed and Sealed this

Sixth Day of March, 2001

*Attest:*

NICHOLAS P. GODICI

*Attesting Officer*     *Acting Director of the United States Patent and Trademark Office*